Figure 1:
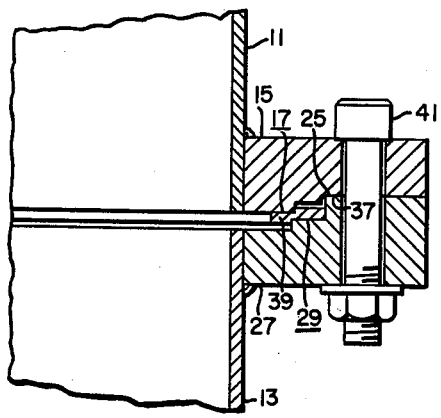

Jan. 26, 1960 W. J. LANGE ET AL 2,922,666
DEMOUNTABLE METAL VACUUM JOINT
Filed June 27, 1957

WITNESSES
Edwin G. Bassler
Robert C. Baird

INVENTORS
William J. Lange
& Daniel Alpert
BY Thomas C. Blair
ATTORNEY

United States Patent Office 2,922,666
Patented Jan. 26, 1960

2,922,666

DEMOUNTABLE METAL VACUUM JOINT

William J. Lange, Monroeville, and Daniel Alpert, Churchill, Pa., assignors to Westinghouse Electric Corporation, East Pittsburgh, Pa., a corporation of Pennsylvania Application June 27, 1957, Serial No. 668,472

3 Claims. (Cl. 285—119)

This invention relates to vacuum joints and, more particularly, to demountable all-metal vacuum joints.

In vacuum joints or seals which are suitable for use in high vacuum and ultra high vacuum, it has been found necessary in many instances to require a high temperature bakeout for the purpose of degassing the components on the vacuum system. Also, the vacuum joints must not evolve large amounts of gas when in use. These two requirements rule out many conventional seals such as those using rubber gaskets, greases, conventional stop cocks, etc. and necessitate the use of special seals.

Demountable all-metal vacuum joints have been made utilizing a gasket made of a metal such as copper which is positioned between flat flanges made of a metal such as steel. While this type of seal is suitable for certain vacuum uses, when it is used with an ultra high vacuum system the seal is frequently found to have leaks. The flanges must be finished to an extreme degree of smoothness for use with a metal such as copper, while other soft metals such as aluminum are not found to be practical in this type of seal.

Another prior art type of seal is that in which a so-called knife edge is made on one or both of the flanges and the knife edge digs into the soft metal gasket when the flanges are tightened together. While these knife edge seals are useful in certain applications they must be very accurately aligned, which in a circular flange seal requires that the knife edges must be accurately concentric and of the same diameter. In addition, it has been found that the knife edges are very expensive to machine properly and if the knife edge is even slightly damaged, the flange is very difficult to repair and usually must be completely remachined.

Therefore, it is an object of our invention to provide an improved vacuum joint.

It is another object to provide an improved metal vacuum joint.

It is a further object to provide an improved demountable all-metal vacuum joint.

It is an additional object to provide an improved all-metal demountable ultra high vacuum joint.

It is an auxiliary object to provide a demountable all-metal vacuum joint which is particularly useful when inserting replaceable electrodes and for connecting two sections of tube or other vacuum system components.

It is a supplementary object to provide a demountable all-metal vacuum joint which is particularly suitable for use with electron discharge devices.

Figure 2:
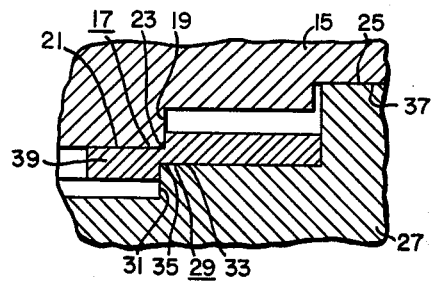

These and other objects of our invention will be apparent from the following description, taken in accordance with the accompanying drawing, throughout which like reference characters indicate like parts, which drawing forms a part of this application and in which:

Figure 1 is a side sectional view of a portion of a metallic vacuum joint in accordance with one embodiment of our invention; and Fig. 2 is an enlarged side sectional view of a detail of the metallic vacuum joint shown in Fig. 1.

In Fig. 1 and in the detail shown in Fig. 2 a side sectional view of a portion of an all-metal vacuum joint is shown including a first vacuum system component 11 and a second vacuum system component 13. A first flange member 15 is attached to the first vacuum system component 11 by a suitable method such as heliarc welding. The first flange member 15 includes a first step portion 17 having a first step riser portion 19 and a first step tread portion 21. A first step deforming portion 23 is located where the first step riser portion 19 joins the first step tread portion 21. The first flange member 15 also includes a first shoulder portion 25 which, in this particular embodiment, has a flat configuration. A second flange member 27 is attached to the second vacuum system component 13 in a manner similar to that mentioned in connection with the first flange member 15. The second flange member 27 includes a second step portion 29 including a second step riser portion 31 and a second step tread portion 33. Here also a second step deforming portion 35 is positioned where the second step riser portion 31 joins the second step tread portion 33. The second flange member 27 also includes a second shoulder portion 37 which should be of a related configuration to the first shoulder portion 25 and in this particular embodiment has a flat configuration. As can be seen in Figs. 1 and 2, the second step portion is inverted and reversed with respect to the first step portion in such a manner that the first step riser portion and the second step riser portion are in substantial alignment with each other.

The first flange member 15 and the second flange member 27 should be made of a hard material. We have found that hard metals such as stainless steel, Monel, Kovar and cold rolled steel are suitable. A soft metal gasket of a metal such as oxygen-free-high conductivity copper is positioned between the first step portion 17 and the second step portion 29 so that when the flanges are tightened together by a clamping means 41, the first shoulder portion 25 is placed in intimate contact with the second shoulder portion 37 so that the first step deforming portion 23 and the second step deforming portion 35 deform the copper gasket 39. We have found that when the copper gasket 39 has been deformed so that the distance between the respective deforming portions is approximately one-half of the original thickness of the copper gasket 39, an excellent all-metal vacuum joint is found which is suitable for use with ultra high vacuum systems, demountable vacuum tubes or other vacuum uses.

In one particular embodiment of our invention the gasket 39 is in the shape of a washer-shaped or flat ring of OFHC copper of about 0.040 inch thickness. The copper gasket 39 is annealed at a temperature of about 950° C. in a hydrogen atmosphere. The seal is made by tightening the clamping means 41, which in this particular embodiment are in the form of nuts and bolts, until the first shoulder portion 25 and the second shoulder portion 37 are in intimate contact to shear the gasket 39 thereby reducing the thickness of the copper gasket 39 at the point of deformation to roughly one-half of its original thickness. With a six inch flange of 3/8 of an inch thickness, we have found that twelve bolts form a satisfactory vacuum joint.

As can be seen, the tolerances and position of the deforming portions are less stringent than in the prior art knife edge seals. For example, while the first step riser portion 19 should be in substantial alignment with the second step riser portion 31, this may include a certain amount of positive or negative overlap of the deforming portions without destroying the utilization of the joint. Also, if a step portion is damaged, for example, by marring a deforming portion, it can be repaired very easily in comparison to the prior art knife edge which had to be completely re-machined. It may be desirable in some instances to have a very small bevel on the deforming portions. For example, we have found that a 45° bevel which is 0.005 inch across still provides a satisfactory seal. The fact that a small bevel or rounded edge may be used rather than a very sharp edge is further evidence of the fact that the stringent tolerances necessary with the knife edge seals are not necessary with our invention.

Another advantage over prior art wire gasket seals is that the washer-shaped copper gasket is rigid enough to enable one to assemble and use seals even when the flanges and the gasket are in a vertical plane even when used with large systems. Also, it should be noted that the shoulder portions serve to position and hold the gasket during assembly as the gasket can be placed against a shoulder portion and will automatically extend past the step portion. Therefore, the gaskets can be made to low tolerances and are readily positioned.

Metallic vacuum joints of the type disclosed in this application have been tested with ultra high vacuum systems and have been subjected to repeated heating cycles to a temperature of 450° C. Such vacuum joints have withstood as many as 70 bakeout cycles and a rate of influx of gas was found to be less than $10^{-12}$ mm. liters/sec. which is a rise of less than 1 micron ($10^{-3}$ mm.) of pressure per century in a 1 liter system.

It will be noted that one particular advantage of our vacuum joint is that when the bolts or other clamping means 41 are tightened so that the first shoulder portion 25 is in intimate contact with the second shoulder portion 37, the gasket 39 has been deformed the correct amount automatically. Therefore the bolts need not be tightened to a certain pressure as happens to be the case with certain knife edge seals, but may be fully tightened without cutting through the soft metal gasket 39. A vacuum joint of this type has been found to be demountable and may be used many times merely by replacing the worn copper metal gasket 39.

While the present invention has been shown in a few forms only, it will be obvious to those skilled in the art that it is not so limited but is susceptible of various changes and modifications without departing from the spirit and scope thereof.

We claim as our invention:

1. In an all metallic vacuum joint, the combination of a first hard metal member having a first annular step portion and a first annular shoulder portion, said first shoulder portion extending above the surface of said first step portion and surrounding said first step portion, a second hard metal member having a second annular step portion and a second annular shoulder portion, clamping means for drawing said first metal member and said second metal member together, a flat annular soft metal gasket positioned between said first and second annular step portions, said first step portion having a first annular step riser portion, a first step tread portion and a first annular step deforming portion formed where said first step riser portion joins said first tread portion, said second step portion having a second annular step riser portion, a second annular step tread portion and a second annular step deforming portion formed where said second step riser portion joins said second step tread portion, said second step portion being inverted and reversed with respect to said first step portion, the surface of said first step riser portion adjacent said first step tread portion and the surface of said second step riser portion adjacent said second step tread portion being in substantial alignment to provide a shearing action on said gasket in response to drawing said first metal member and said second metal member together, said first step tread portion and said second step tread portion being substantially parallel and extending in opposite directions from said first and second step riser portions, said flat annular soft metal gasket having a thickness less than the height of said first and second step riser portions, said soft metal gasket being permanently deformed by the shearing action provided by said first deforming portion and said second deforming portion, said first and second shoulder portions engaging to maintain the planes containing said first deforming portion and said second deforming portion spaced apart by distance less than the original thickness of said soft metal gasket thereby forming an all metallic vacuum joint.

2. In an all metallic vacuum joint, the combination of a first hard metal member having a first annular step portion, said step portion consisting of a first step tread portion and a second step tread portion, said first and second step tread portions separated by a first step riser portion, a second hard metal member having a second annular step portion, said second annular step portion consisting of a third step tread portion and a fourth step tread portion, said third and fourth step tread portions being separated by a second step riser portion, said second step portion being inverted and reversed with respect to said first step portion, said first, second, third and fourth step tread portions being substantially parallel, a first annular shoulder portion surrounding said first annular step portion and extending above the surface of said step portion, a second annular shoulder portion surrounding said second annular step portion, clamping means for drawing said first metal member and said second metal member together, a flat annular soft metal gasket having a thickness less than the height of said first and second step riser portions, said gasket having an outer diameter less than the inner diameter of said first shoulder portion so as to position said gasket within said first metal member, said gasket having an inner diameter less than the diameter of said first and second step riser portions, said first and second step riser portions being in substantial alignment to provide a shearing action on said gasket member when said first and second members are clamped together, said soft metal gasket being permanently deformed by a portion of said second step tread portion and said third step tread portion adjacent said step riser portions, said first and second shoulder portions engaging to maintain the planes containing said portions of said step tread portions deforming said gasket spaced apart by a distance less than the original thickness of said soft metal gasket thereby forming an all metallic vacuum joint.

3. In an all metallic vacuum joint, the combination of a first hard metal member having a first annular step portion, said first step portion comprised of an inner step tread portion and an outer step tread portion, said outer step tread portion projecting above the surface of said inner step tread portion, said inner and outer step tread portions being substantially parallel to each other, a step riser portion between said inner and outer step tread portions being substantially perpendicular to said inner and outer step tread portions, a first annular shoulder portion surrounding said outer step tread portion of said first step portion, a second hard metal member having a second annular step portion, said second annular step portion comprised of an inner and an outer step tread portion being substantially parallel to each other, said inner step tread portion of said second annular step portion projecting above the surface of said outer step tread portion, an annular step riser portion positioned between said inner and outer step tread portions and being substantially perpendicular to said outer and inner step tread portions of said second annular step portion, a second annular shoulder portion surrounding said outer step tread portion of said second step portion, clamping means for drawing said first and second metal members together, a flat annular soft metal gasket having a thickness less than the height of said first and second step riser portion positioned between said step portions, said soft metal gasket being permanently deformed by said outer step tread portion of said first member and said inner step tread portion of said second member where said step tread portions joins said step riser portions, said first and second step riser portions being in substantial alignment to provide a shearing action on said gasket in response to clamping said first and second metal members together, said first and second shoulder portions engaging to maintain the planes containing said step tread portions deforming said gasket being spaced apart by a distance less than the original thickness of said soft metal gasket thereby forming an all metallic vacuum joint.

References Cited in the file of this patent

UNITED STATES PATENTS

| | | |
|---|---|---|
| 1,477,560 | Heeney | Dec. 18, 1923 |
| 1,715,854 | Martyn | June 4, 1929 |
| 1,799,834 | Waterman | Apr. 7, 1931 |
| 1,873,855 | Wilson | Aug. 23, 1932 |
| 2,455,982 | Dowty | Dec. 14, 1948 |
| 2,538,393 | Stecher | Jan. 16, 1951 |

FOREIGN PATENTS

| | | |
|---|---|---|
| 107 | Italy | Mar. 31, 1867 |
| 1,055,534 | France | Oct. 14, 1953 |